(12) United States Patent
Omori

(10) Patent No.: US 11,293,482 B2
(45) Date of Patent: Apr. 5, 2022

(54) RADIAL FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/977,983

(22) PCT Filed: Mar. 6, 2019

(86) PCT No.: PCT/JP2019/008805
§ 371 (c)(1),
(2) Date: Oct. 6, 2020

(87) PCT Pub. No.: WO2019/172301
PCT Pub. Date: Sep. 12, 2019

(65) Prior Publication Data
US 2021/0054875 A1 Feb. 25, 2021

(30) Foreign Application Priority Data
Mar. 7, 2018 (JP) .............................. JP2018-041287

(51) Int. Cl.
*F16C 17/02* (2006.01)
(52) U.S. Cl.
CPC .................................. *F16C 17/024* (2013.01)
(58) Field of Classification Search
CPC ................................................... F16C 17/024
See application file for complete search history.

(56) References Cited

U.S. PATENT DOCUMENTS

| 3,215,480 | A | 11/1965 | Marley | |
|---|---|---|---|---|
| 8,845,193 | B2 * | 9/2014 | Omori | F16C 17/024 384/103 |
| 10,781,853 | B2 * | 9/2020 | Omori | F16C 17/024 |
| 2004/0179759 | A1 | 9/2004 | Katou et al. | |
| 2011/0103725 | A1 | 5/2011 | Omori | |
| 2014/0147064 | A1 | 5/2014 | Omori | |
| 2016/0010682 | A1 | 1/2016 | Omori | |
| 2016/0312655 | A1 | 10/2016 | Yoshino et al. | |

FOREIGN PATENT DOCUMENTS

| CN | 103717927 A | 4/2014 |
|---|---|---|
| EP | 2 778 448 A1 | 9/2014 |
| JP | S63-166719 U | 10/1988 |
| JP | 2004-011839 A | 1/2004 |
| JP | 2004-270904 A | 9/2004 |
| JP | 2006-057652 A | 3/2006 |
| JP | 2006-057828 A | 3/2006 |
| JP | 2009-299748 A | 12/2009 |
| JP | 2013-032799 A | 2/2013 |
| JP | 2013-100885 A | 5/2013 |
| JP | 2015-143572 A | 8/2015 |

* cited by examiner

Primary Examiner — James Pilkington

(57) ABSTRACT

A radial foil bearing includes a bearing housing which has an insertion hole through which a shaft is inserted, a back foil which is disposed on an inner peripheral surface of the insertion hole, and an engagement member which includes a first part and a second part, the first part being disposed to overlap the back foil in a radial direction of the insertion hole and engaged with the back foil, and the second part being attached to the bearing housing, in which the first part has an engagement groove which extends to an end edge of the first part in an axial direction of the insertion hole, and the back foil is disposed in the engagement groove.

10 Claims, 13 Drawing Sheets

RADIAL FOIL BEARING

CROSS REFERENCE TO RELATED APPLICATIONS

This patent application is a U.S. national-stage application under 35 U.S.C. § 371 of International Patent Application No. PCT/JP2019/008805 filed on Mar. 6, 2019, which claims the benefit of foreign priority to Japanese Patent Application No. JP 2018-041287 filed on Mar. 7, 2018, the content of which is incorporated herein by reference. The International Application was published in Japanese on Sep. 12, 2019, as International Publication No. WO 2019/172301 A1 under PCT Article 21(2).

TECHNICAL FIELD

The present disclosure relates to a radial foil bearing.

BACKGROUND ART

A radial bearing that is disposed and used outside a rotary shaft is known as a bearing for a high-speed rotating body. As such a radial bearing, a radial foil bearing including a thin plate-shaped top foil that forms a bearing surface, a back foil that elastically supports the top foil, and a cylindrical bearing housing that houses the top foil and the back foil is well known. As the back foil of the radial foil bearing, a bump foil obtained by forming a thin plate into a corrugated plate shape is mainly used.

In such a radial foil bearing, since there is a possibility that the back foil comes off from the housing, the back foil is attached to the housing, for example, using welding (spot welding) in some cases. However, when welding (spot welding) is used, there is a possibility that the back foil or the housing may deform. As a result, distortion may occur in the top foil to affect a load capacity or dynamic characteristics (stiffness and attenuation) of the bearing, and thus there is a possibility that a sufficient support capacity cannot be obtained. Therefore, in the radial foil bearing in Patent Document 1 below, engagement protrusions are provided on both side end portions on an inner peripheral surface of the housing, and engagement notches are provided in both side peripheral edge portions of the back foil. As the engagement protrusions are engaged with the engagement notches, the back foil is prevented from coming off of the housing.

DOCUMENT OF RELATED ART

Patent Document

[Patent Document 1] Japanese Unexamined Patent Application, First Publication No. 2013-100885

SUMMARY OF INVENTION

Technical Problem

The back foil is pressed by the top foil from above when the rotary shaft is inserted through the housing. However, before the rotary shaft is inserted through the housing, this pressing force is weak, and accordingly there is a possibility that the engagement notch of the back foil may come off from the engagement protrusion of the housing.

The present disclosure has been made in view of the above-described problems, and an object thereof is to prevent a back foil from coming off of a housing.

Solution to Problem

A radial foil bearing according to an aspect of the present disclosure includes a bearing housing which has an insertion hole through which a shaft is inserted, a back foil which is disposed on an inner peripheral surface of the insertion hole, and an engagement member which includes a first part and a second part, the first part being disposed to overlap the back foil in a radial direction of the insertion hole and engaged with the back foil, and the second part being attached to the bearing housing, in which the first part has an engagement groove which extends to an end edge of the first part in an axial direction of the insertion hole, and the back foil is disposed in the engagement groove.

In the radial foil bearing according to the aspect, the back foil may have crest portions and trough portions which are alternately formed in a circumferential direction of the inner peripheral surface of the insertion hole, and the first part may have a first claw portion and a second claw portion provided on opposing sides of the engagement groove with respect to each other, the first claw portion being disposed inside the trough portion in the radial direction, and the second claw portion being disposed outside the crest portion in the radial direction.

In the radial foil bearing according to the aspect, the radial foil bearing may further include an intermediate foil which is supported by the back foil and has a groove portion disposed inside the trough portion in the radial direction, and the first claw portion may be disposed inside the groove portion in the radial direction.

In the radial foil bearing according to the aspect, in the first part, the second claw portions may be provided on both sides of the first claw portion.

In the radial foil bearing according to the aspect, the engagement member may be attached to an end surface of the bearing housing in the axial direction to be slidable in the radial direction.

In the radial foil bearing according to the aspect, the bearing housing may have a housing groove which is provided in an end surface of the bearing housing in the axial direction and extends outward in the radial direction from an inner periphery edge of the insertion hole, and the second part may be disposed in the housing groove.

In the radial foil bearing according to the aspect, the radial foil bearing may further include a lid which is attached to an end surface of the bearing housing in the axial direction and covers the engagement member.

In the radial foil bearing according to the aspect, the radial foil bearing may further include a preload portion which is provided between the bearing housing and the lid and is configured to apply a preload in the axial direction to the engagement member.

In the radial foil bearing according to the aspect, the preload portion may have a bulge portion which protrudes from at least one of the engagement member, the bearing housing, and the lid, and is disposed between the engagement member and the bearing housing or between the engagement member and the lid.

In the radial foil bearing according to the aspect, the preload portion may have an elastic body disposed between the engagement member and the bearing housing or between the engagement member and the lid.

Effects of Invention

According to the present disclosure, the back foil can be prevented from coming off of the bearing housing.

DESCRIPTION OF EMBODIMENTS

Hereinafter, a radial foil bearing of the present disclosure will be described in detail with reference to the drawings.

Figure 1:
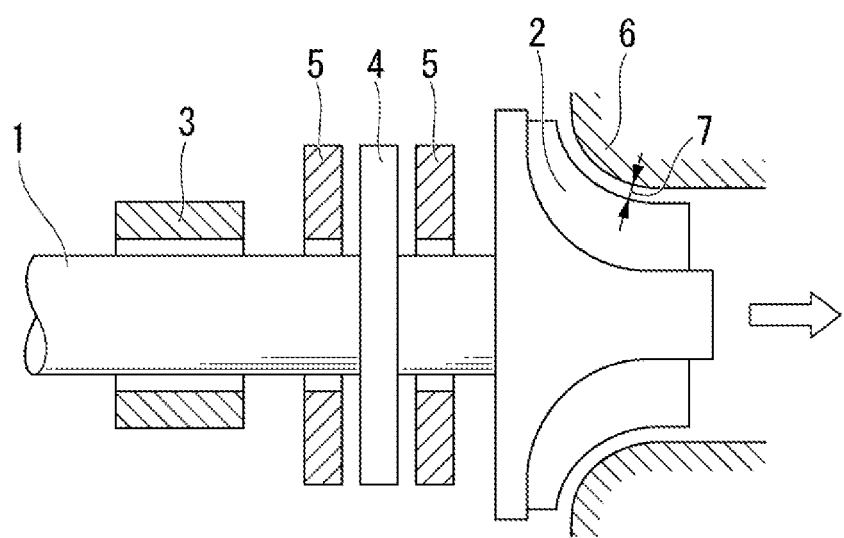
FIG. 1 is a side view illustrating an example of a turbomachine to which a radial foil bearing of the present disclosure is applied.

FIG. 1 is a side view illustrating an example of a turbomachine to which the radial foil bearing of the present disclosure is applied.

In FIG. 1, the reference sign 1 indicates a rotary shaft (shaft), the reference sign 2 indicates an impeller provided at a tip end of the rotary shaft on one side in an axial direction of the rotary shaft, and the reference sign 3 indicates the radial foil bearing according to the present disclosure. Although only one radial foil bearing is illustrated in FIG. 1 for the sake of simplicity, normally two radial foil bearings are provided in the axial direction of the rotary shaft 1. Therefore, also in the embodiment, two radial foil bearings 3 are provided.

The radial foil bearing 3 is disposed outside the rotary shaft 1. That is, the rotary shaft 1 is inserted through the radial foil bearing 3. A thrust collar 4 is provided between the impeller 2 of the rotary shaft 1 and the radial foil bearing 3. Thrust bearings 5 are disposed on both sides of the thrust collar 4 in the axial direction. The rotary shaft 1 is inserted through the thrust bearings 5. The impeller 2 is disposed in a housing 6, which is a stationary side, and a tip clearance 7 is formed between the housing 6 and the impeller 2.

Figure 2:
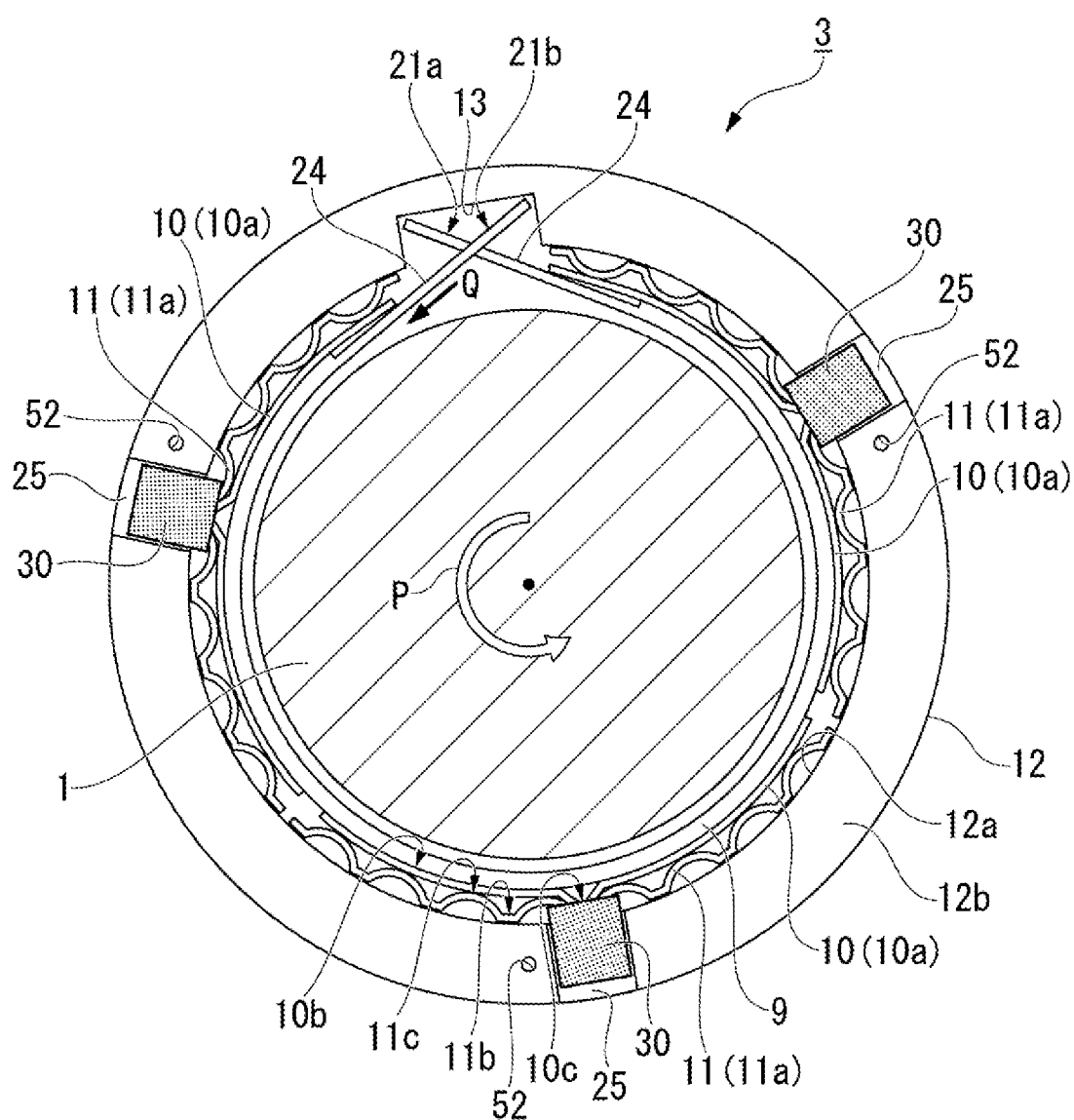
FIG. 2 is a front view illustrating the radial foil bearing according to the present disclosure.
Figure 3:
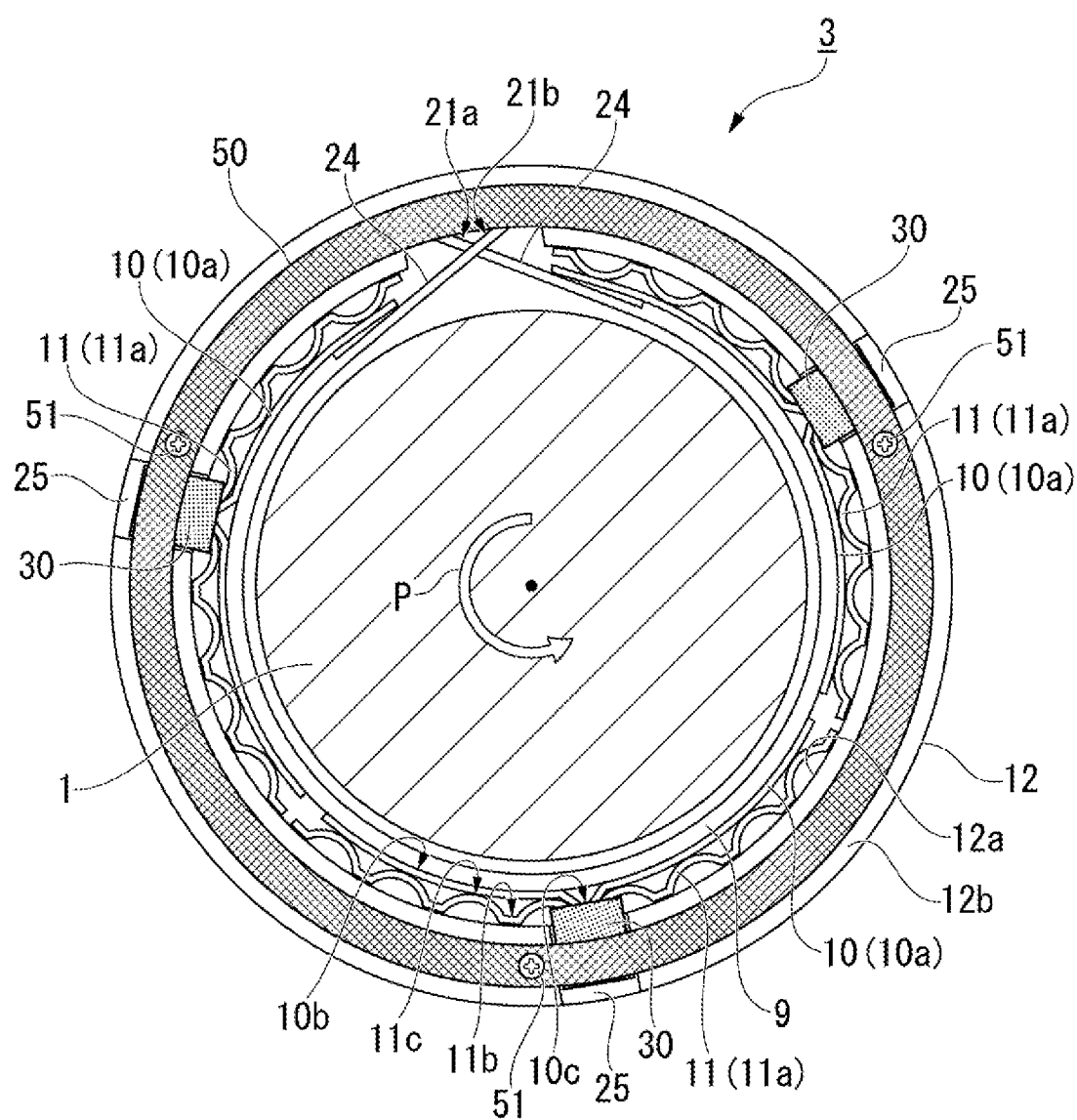
FIG. 3 is a front view illustrating a state where a lid is attached to the radial foil bearing according to the present disclosure.

FIG. 2 is a front view illustrating the radial foil bearing 3 according to the present disclosure. FIG. 3 is a front view illustrating a state where a lid 50 is attached to the radial foil bearing 3 according to the present disclosure.

The radial foil bearing 3 is disposed outside the rotary shaft 1 and supports the rotary shaft 1. The radial foil bearing 3 includes a top foil 9, an intermediate foil 10, a back foil 11, and a bearing housing 12. The bearing housing 12 has an insertion hole 12a through which the rotary shaft 1 is inserted.

In the following description, a positional relationship between respective members may be described with the insertion hole 12a as reference. Specifically, an "axial direction" refers to a direction in which the insertion hole 12a extends (a direction in which the rotary shaft 1 is inserted). A "radial direction" refers to a radial direction of the insertion hole 12a. A "circumferential direction" refers to a circumferential direction along an inner peripheral surface of the insertion hole 12a.

The bearing housing 12 is a cylindrical member that configures an outermost portion of the radial foil bearing 3 in the radial direction. The insertion hole 12a is formed in the bearing housing 12. The back foil 11, the intermediate foil 10, and the top foil 9 are housed in the insertion hole 12a. Specifically, the back foil 11 is supported by the inner peripheral surface of the insertion hole 12a, the intermediate foil 10 is supported by the back foil 11, and the top foil 9 is supported by the intermediate foil 10. The bearing housing 12 of the present disclosure is a cylindrical member having the insertion hole 12a. However, the bearing housing 12 may be a member having other than a cylindrical shape (for example, a prismatic member) insofar as the bearing housing 12 has the insertion hole 12a.

Figure 4A:
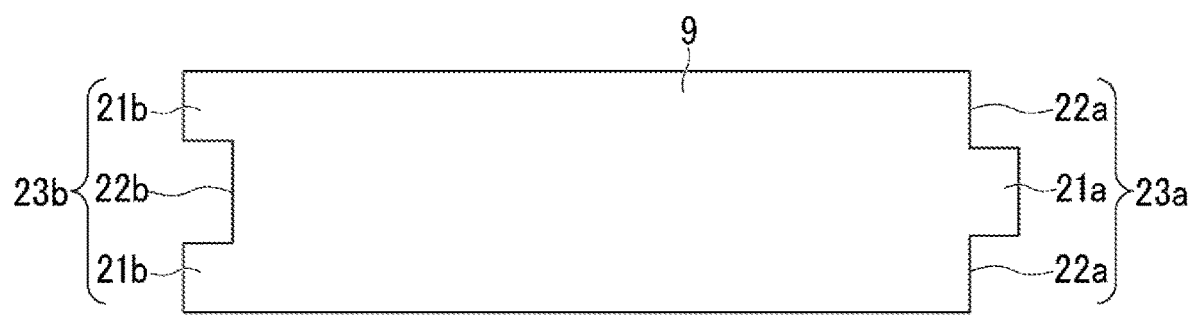
FIG. 4A is an unfolded plan view of a top foil according to the present disclosure.
Figure 4B:
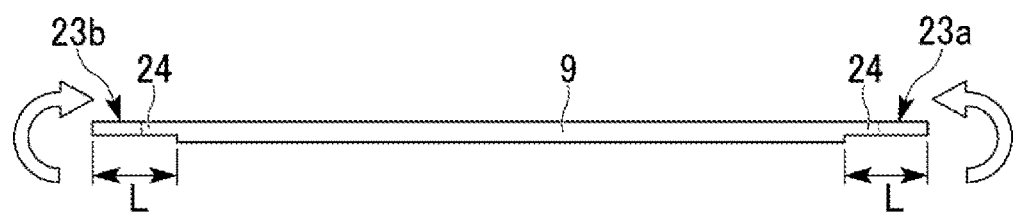
FIG. 4B is an unfolded front view of the top foil according to the present disclosure.

FIG. 4A is an unfolded plan view of the top foil 9 according to the present disclosure, and FIG. 4B is an unfolded front view of the top foil 9 according to the present disclosure.

As shown in FIG. 4A, the top foil 9 is a rectangular metal foil having a long side in the circumferential direction and a short side in the axial direction. As shown in FIG. 2, the top foil 9 is wound in a cylindrical shape and is disposed to face a peripheral surface of the rotary shaft 1.

As shown in FIG. 4A, a first uneven portion 23a is formed on a first short side of the top foil 9 in a long-side direction, and the first uneven portion 23a has one protruding portion 21a protruding to a first side in the long-side direction and two recessed portions 22a formed on both sides of the protruding portion 21a in a short-side direction. That is, the first short side of the top foil 9 in the long-side direction includes one protruding portion 21a protruding to the first side in the long-side direction and steps positioned on both sides of the protruding portion 21a in the short-side direction.

In addition, a second uneven portion 23b is formed on a second short side (a short side positioned on a second side in the long-side direction) which is opposite to the first short side of the top foil 9, and the second uneven portion 23b has two protruding portions 21b spaced apart from each other in the short-side direction and one recessed portion 22b positioned between the two protruding portions 21b. That is, the short side of the top foil 9 positioned on the second side in the long-side direction includes the recessed portion 22b recessed to the first side in the long-side direction and steps positioned on both sides of the recessed portion 22b in the short-side direction.

The recessed portion 22b of the second uneven portion 23b is formed to correspond to the protruding portion 21a of the first uneven portion 23a. In addition, the recessed portions 22a of the first uneven portion 23a are formed to correspond to the protruding portions 21b of the second uneven portion 23b. That is, the minimum interval of the recessed portion 22b in the short-side direction is larger than the maximum width of the protruding portion 21a in the short-side direction. In the present disclosure, the interval of the recessed portion 22b in the long-side direction and the length of the protruding portion 21a in the long-side direction are the same.

The recessed portion 22b of the second uneven portion 23b is formed such that the protruding portion 21a passes through the recessed portion 22b when the top foil 9 is wound in a cylindrical shape such that the first uneven portion 23a and the second uneven portion 23b overlap each other. Similarly, the recessed portions 22a of the first uneven portion 23a are formed such that the protruding portions 21b pass through the recessed portions 22a respectively when the top foil 9 is wound in a cylindrical shape.

As shown in FIG. 2, the protruding portions 21a and 21b that have passed through the recessed portions 22b and 22a respectively are extracted toward the bearing housing 12. That is, when the top foil 9 disposed on an inner peripheral side of the insertion hole 12a is seen in the axial direction, the protruding portion 21a and the protruding portions 21b intersect each other. In addition, the protruding portion 21a of the top foil 9 is positioned between the two protruding portions 21b in the axial direction. A groove 13 is formed in the inner peripheral surface of the insertion hole 12a of the bearing housing 12, and the protruding portions 21a and 21b are housed in the groove 13. The groove 13 extends from one end surface 12b to the other end surface 12b of the bearing housing 12 in the axial direction.

As shown in FIG. 4B, thin wall portions 24 are formed on part (a first short side part) of the top foil 9 where the first uneven portion 23a is formed and on part (a second short side part) of the top foil 9 where the second uneven portion 23b is formed, and each thin wall portion 24 has a small thickness (is thin) compared to a middle portion between the thin wall portions 24. As shown in FIG. 2, an outer peripheral surface (a surface on the bearing housing 12 side) of the thin wall portion 24 is recessed and thin more than the outer peripheral surface of the middle portion of the top foil 9. As shown in FIG. 2, the length L of the thin wall portion 24 in the circumferential direction is set to a length corresponding to the groove 13 and one crest portion 11c at an end portion of the back foil 11. In the present disclosure, steps are provided in the outer peripheral surface of the top foil 9 disposed in the bearing housing 12, and the top foil 9 becomes thin via the steps. In addition, each thin wall portion 24 extends, from the respective end of the top foil 9 in the circumferential direction, to a circumferential position beyond the crest portion 11c which is the closest to the end of the top foil 9.

As shown in FIG. 2, housing grooves 25 are formed on each end surface 12b of the bearing housing 12 in the axial direction, and each housing groove 25 extends outward in the radial direction from an inner periphery edge of the insertion hole 12a. That is, each end surface 12b of the bearing housing 12 in the axial direction includes recessed portions recessed from the inner periphery of the bearing housing 12. The housing grooves 25 of the present disclosure are formed at positions where the end surface 12b of the bearing housing 12 is almost divided in three in the circumferential direction. An engagement member 30 (a claw member) to be described later is engaged with the housing groove 25. In the present embodiment, the groove 13 is disposed between two housing grooves 25, among the three housing grooves 25. Further, one housing groove 25 faces the groove 13 in the radial direction.

The back foil 11 is disposed on the inner peripheral surface of the insertion hole 12a of the bearing housing 12. The back foil 11 is a foil (thin plate) that elastically supports the intermediate foil 10 and the top foil 9. As the back foil 11, for example, a bump foil, spring foils described in Japanese Unexamined Patent Application, First Publication No. 2006-57652 and Japanese Unexamined Patent Application, First Publication No. 2004-270904, and a back foil described in Japanese Unexamined Patent Application, First Publication No. 2009-299748 may be used. In the present embodiment, a bump foil is used as the back foil 11.

The back foil 11 of the present disclosure is configured of a plurality of (three) back foil pieces 11a disposed along the inner peripheral surface of the insertion hole 12a. The back foil piece 11a is a foil (thin plate) that is corrugated in the circumferential direction. The three back foil pieces 11a are curved to have a substantially cylindrical shape as a whole when seen from the axial direction. The back foil pieces 11a are supported by the inner peripheral surface of the insertion hole 12a. In the present disclosure, all of the three back foil pieces 11a are formed in the same shape and have the same dimensions. Therefore, the back foil pieces 11a are disposed such that the back foil pieces 11a divide the inner peripheral surface of the insertion hole 12a into substantially three equal parts in the circumferential direction.

The back foil piece 11a is formed such that the crest portions 11c protruding inward in the radial direction and trough portions 11b protruding outward in the radial direction when seen from the crest portion 11c are alternately disposed in the circumferential direction. That is, the back foil piece 11a (back foil 11) has protruding portions and recessed portions in the circumferential direction of the insertion hole 12a. Flat portions of the trough portions 11b facing the bearing housing 12 can come into contact with the inner peripheral surface of the insertion hole 12a. In addition, the crest portions 11c can come into contact with the intermediate foil 10 (intermediate foil pieces 10a). As described above, the crest portions 11c of the back foil piece 11a elastically support the top foil 9 via the intermediate foil pieces 10a. Both ends of the back foil piece 11a in the circumferential direction are the trough portions 11b.

The intermediate foil 10 is disposed between the top foil 9 and the back foil 11. In the present disclosure, the intermediate foil 10 is configured of three intermediate foil pieces 10a disposed along the inner peripheral surface of the insertion hole 12a. The three intermediate foil pieces 10a each have a substantially rectangular shape when the intermediate foil pieces 10a are unfolded, and are curved in a substantially cylindrical shape as a whole when seen from the axial direction, as shown in FIG. 2. In the present disclosure, all of the three intermediate foil pieces 10a are formed in the same shape and have the same dimensions. Therefore, the intermediate foil pieces 10a are disposed such that the intermediate foil pieces 10a divide the inner peripheral surface of the insertion hole 12a into substantially three equal parts in the circumferential direction.

The thickness of the intermediate foil piece 10a is smaller than the thickness of the back foil piece 11a. The stiffness of the intermediate foil 10 is equal to or lower than half the stiffness of the back foil 11. The outer shape of the intermediate foil piece 10a has substantially the same size as the outer shape of the back foil piece 11a. The intermediate foil piece 10a has a flat surface portion 10b that is in contact with tops of the crest portions 11c of the back foil 11 and a groove portion 10c that is recessed (protruding) outward in the radial direction from the flat surface portion 10b. That is, the groove portion 10c is spaced apart from the top foil 9. The groove portion 10c is formed at a position between both ends of the intermediate foil piece 10a in the circumferential direction (a middle position of the intermediate foil piece 10a in the circumferential direction in the present disclosure). Parts of the intermediate foil piece 10a on both sides of the groove portion 10c can come into contact with the crest portions 11c on both sides of the trough portion 11b of the back foil piece 11a that faces the groove portion 10c.

Figure 5:
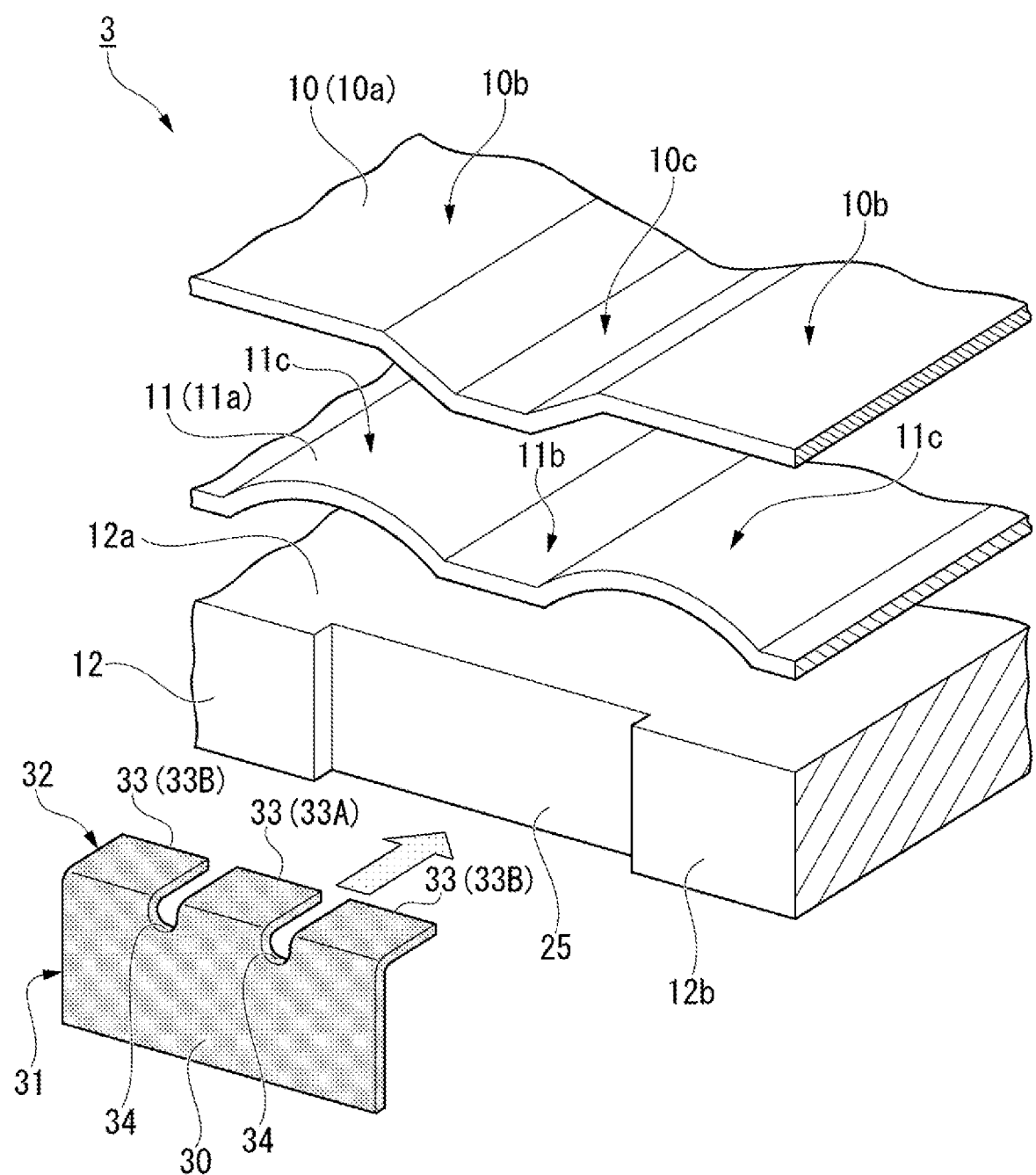
FIG. 5 is a perspective view illustrating an engagement member that is engaged with an intermediate foil and a back foil and is attached to a bearing housing according to the present disclosure.
Figure 6:
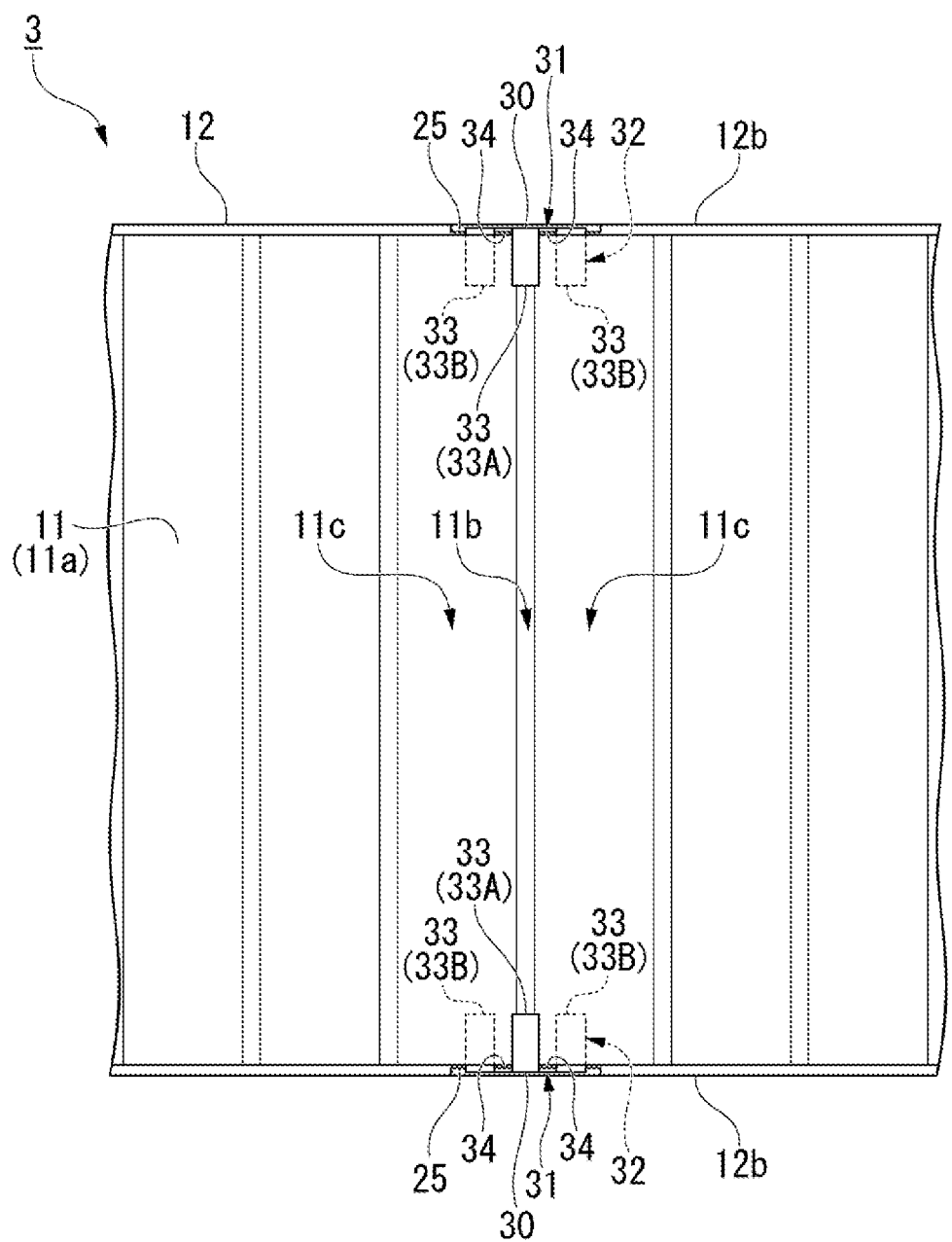
FIG. 6 is an unfolded plan view of the bearing housing illustrating an arrangement of the engagement member with respect to the back foil according to the present disclosure.
Figure 7:
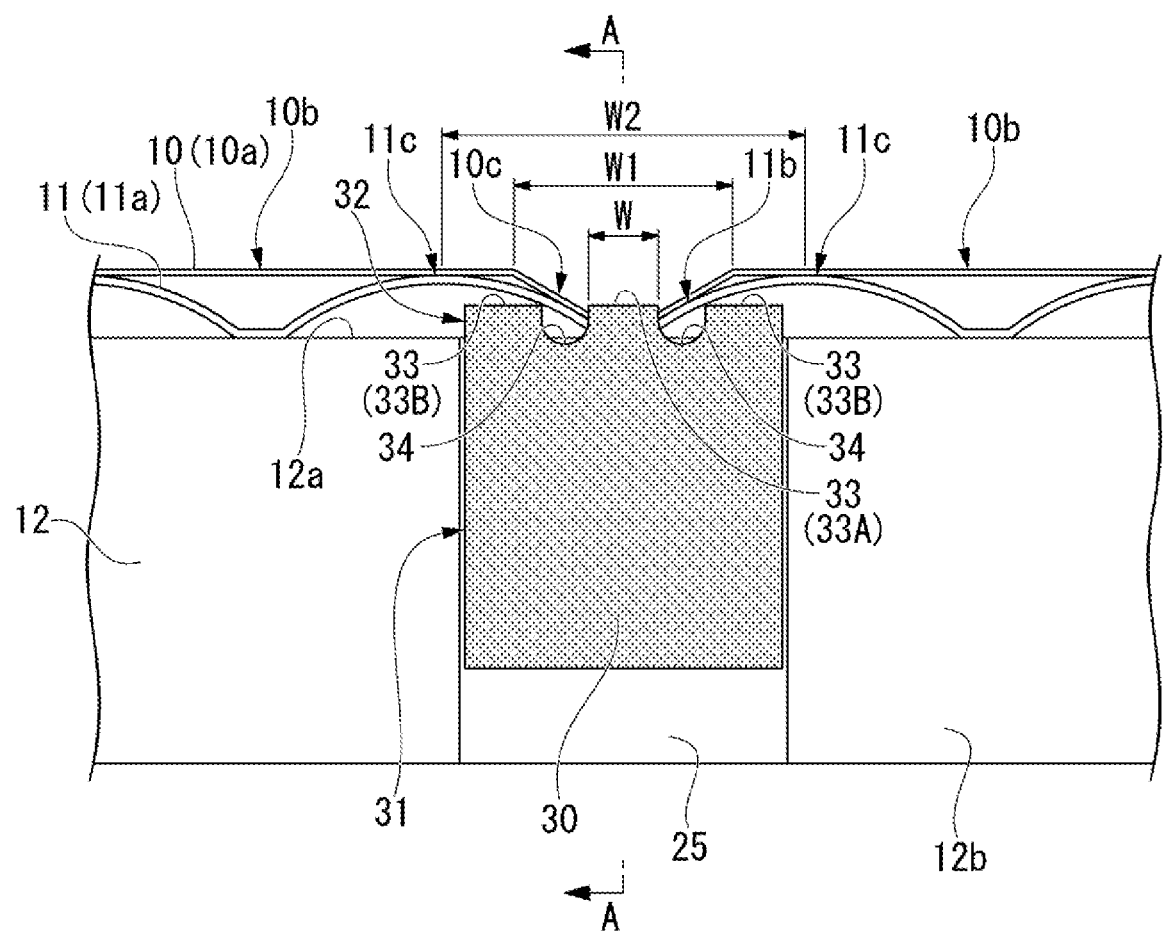
FIG. 7 is a front view illustrating an arrangement of the engagement member with respect to the intermediate foil and the back foil according to the present disclosure.
Figure 8:
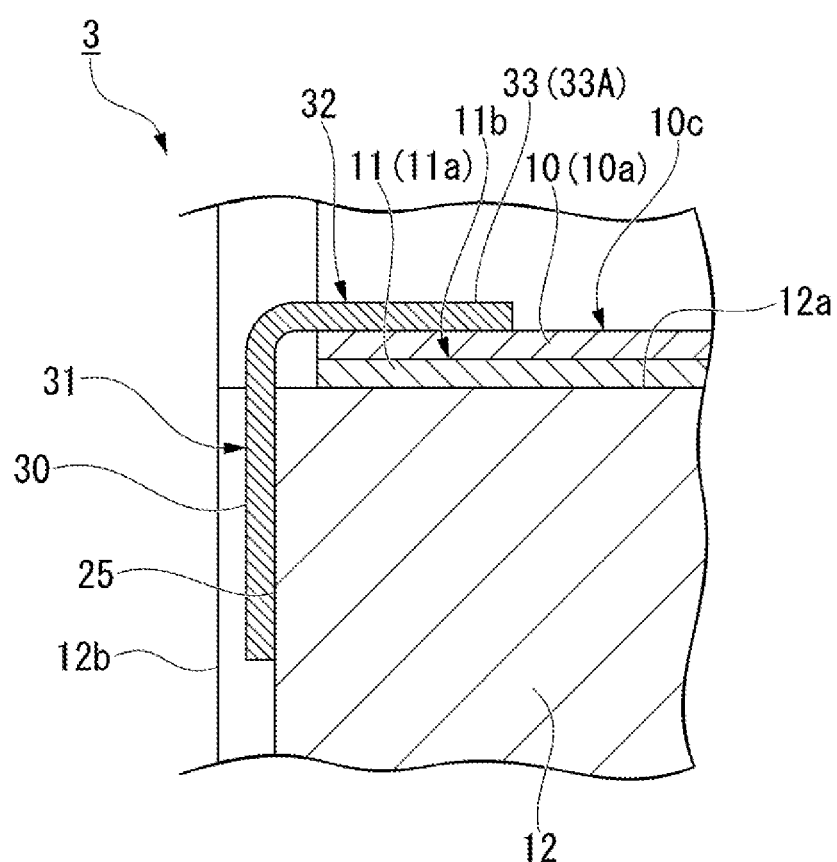
FIG. 8 is a sectional view taken along the line A-A in FIG. 7.

FIG. 5 is a perspective view illustrating the engagement member 30 that is engaged with the intermediate foil 10 and the back foil 11 and is attached to the bearing housing 12 according to the present disclosure. FIG. 6 is an unfolded plan view of the bearing housing 12 illustrating an arrangement of the engagement members 30 with respect to the back foil 11 according to the present disclosure. FIG. 7 is a front view illustrating an arrangement of the engagement member 30 with respect to the intermediate foil 10 and the back foil 11 according to the present disclosure. FIG. 8 is a sectional view taken along the line A-A in FIG. 7.

As shown in FIG. 5, the engagement member 30 includes a body portion 31 (second part), a bent portion 32 (first part) which is bent with respect to the body portion 31, a plurality of claw portions 33 which are provided in the bent portion 32, and engagement grooves 34 provided between the plurality of claw portions 33. The engagement member 30 of the present disclosure is formed by bending a single plate member. As shown in FIG. 6, the engagement members 30 are attached to both end surfaces 12b of the bearing housing 12 in the axial direction.

As shown in FIG. 7, the body portion 31 is disposed in the housing groove 25 of the bearing housing 12, and thereby the body portion 31 is attached to the end surface 12b of the bearing housing 12 in the axial direction. The body portion 31 in the present disclosure is formed in a rectangular plate shape. The width of the body portion 31 is slightly smaller than the width of the housing groove 25, and the body portion 31 is engaged with the housing groove 25 so as to be slidable in the radial direction (an up-and-down direction of the page of FIG. 7).

As shown in FIG. 8, the bent portion 32 is connected to a radially inner end (upper end) of the body portion 31. The bent portion 32 is bent from the body portion 31 and extends in the axial direction. The bent portion 32 is bent at an approximately right angle with respect to the body portion 31. The body portion 31 faces the end surface 12b (a bottom surface of the housing groove 25) of the bearing housing 12 in the axial direction. The bent portion 32 faces the inner peripheral surface of the insertion hole 12a of the bearing housing 12 in the radial direction. That is, the engagement member 30 attached to the housing groove 25 includes a part (body portion 31, second part) disposed in the housing groove 25 and extending in the radial direction, and a part (bent portion 32, first part) extending in the axial direction. When the body portion 31 is disposed in the housing groove 25, a tip end of the bent portion 32 extends to an arrangement area of the back foil 11 (and the intermediate foil 10) in the axial direction (a left-and-right direction of the page of FIG. 7). That is, the engagement member 30 is housed in the housing groove 25 in a state where the engagement member 30 is engaged with the back foil 11 (and the intermediate foil 10).

As shown in FIG. 5, the engagement groove 34 extends from the tip end of the bent portion 32 to the body portion 31. That is, the engagement groove 34 extends to a radially inner portion of the body portion 31 via the bent portion 32. By providing the engagement grooves 34, the bent cross section of the bent portion 32 is reduced, and thus the bent portion 32 (claw portions 33) can be easily formed by bending. The engagement groove 34 may be formed such that the engagement groove 34 does not extend to the body portion 31 and is provided in only the bent portion 32. That is, it is sufficient that the engagement groove 34 extends to an end edge (the tip end of the bent portion 32) of the engagement member 30 in the axial direction of the insertion hole 12a that overlaps the back foil 11 (and the intermediate foil 10) in the radial direction of the insertion hole 12a.

As shown in FIG. 6, the back foil 11 (and the intermediate foil 10) is disposed through the engagement grooves 34. The back foil 11 (and the intermediate foil 10) can be engaged with the engagement grooves 34 in the axial direction (an up-and-down direction of the page of FIG. 6), and can be inserted through the engagement grooves 34 in the circumferential direction (a left-and-right direction of the page of FIG. 6). That is, the back foil 11 passes through the engagement grooves 34 along the circumferential direction. A portion of the bent portion 32 positioned on a first side of the engagement groove 34 in the circumferential direction faces an inner peripheral surface of the back foil 11, and a portion of the bent portion 32 positioned on a second side of the engagement groove 34 in the circumferential direction faces an outer peripheral surface of the back foil 11.

As shown in FIG. 6, the plurality of claw portions 33 include a first claw portion 33A disposed radially inside (front side of the paper in FIG. 6) the trough portion 11b of the back foil 11, and a second claw portion 33B disposed radially outside (back side of the paper in FIG. 6) the crest portion 11c of the back foil 11. The first claw portion 33A and the second claw portion 33B are provided on opposing sides of the engagement groove 34 with respect to each other. In the present disclosure, the crest portion 11c of the back foil 11 is adjacent to the trough portion 11b in the circumferential direction. The engagement member 30 of the present disclosure is a three-claw type member in which the second claw portions 33B are provided on both sides of the first claw portion 33A, and two engagement grooves 34 are formed on both sides of the first claw portion 33A.

As shown in FIG. 7, the groove portion 10c of the intermediate foil 10 is disposed to overlap a radially inner portion (upper portion of the paper in FIG. 7) of the trough portion 11b of the back foil 11. The first claw portion 33A is disposed radially inside the groove portion 10c overlapping the trough portion 11b. The width W of the first claw portion 33A in the circumferential direction is smaller than the width W1 of the groove portion 10c of the intermediate foil 10. As shown in FIG. 5, the groove portion 10c of the present disclosure includes a flat bottom portion which is positioned on a radially outer side than the flat surface portion 10b and extends in the circumferential direction, and taper portions which are positioned at both ends of the bottom portion in the circumferential direction and extend inward in the radial direction as it goes toward the flat surface portions 10b. The width W1 of the groove portion 10c is an interval, in the circumferential direction, from an upper end of one taper portion to an upper end of the other taper portion.

As shown in FIG. 7, the width W of the first claw portion 33A in the circumferential direction is smaller than the width W2 of the trough portion 11b of the back foil 11. The width W2 of the trough portion 11b is not the width of the flat portion (refer to FIG. 5) which is a peak, on the radially outer side (on a bottom side), of the trough portion 11b, but is an interval between peaks, on the radially inner side, of the trough portions 11b, that is, an interval from the peak (apex) of one crest portion 11c to the peak (apex) of the other crest portion 11c of two crest portions 11c which are adjacent to each other with the trough portion 11b interposed therebetween. The width W2 of the trough portion 11b is larger than the width W1 of the groove portion 10c. Therefore, the width W of the first claw portion 33A, the width W1 of the groove portion 10c, and the width W2 of the trough portion 11b satisfy the relationship of W<W1<W2. The bent portion 32 is positioned between the peaks (apexes) of the two crest portions 11c which are adjacent to each other with the trough portion 11b interposed therebetween.

The width of the second claw portion 33B is the same as the width of the first claw portion 33A, but the width of the second claw portion 33B may be different from the width of the first claw portion 33A. In addition, the width of the engagement groove 34 in the circumferential direction is larger than at least the total thickness of the intermediate foil 10 and the back foil 11, and more preferably, is set such that the intermediate foil 10 and the back foil 11 can be obliquely inserted through the engagement groove 34, specifically, is set to about 2 to 10 times larger than the total thickness of the intermediate foil 10 and the back foil 11.

Returning to FIG. 3, the lids 50 are attached to both end surfaces 12b of the bearing housing 12 in the axial direction. The lid 50 covers the housing grooves 25 that house the engagement members 30. In the present disclosure, the lid 50 is formed in an annular plate shape along the circumferential direction of the bearing housing 12. The diameter of an inner peripheral edge of the lid 50 is larger than the diameter of an inner peripheral edge of the bearing housing 12. The diameter of an outer peripheral edge of the lid 50 is smaller than the diameter of an outer peripheral edge of the bearing housing 12.

Screw holes 52 (refer to FIG. 2) are formed in the bearing housing 12 at positions near the housing grooves 25, and the lid 50 is fixed to the bearing housing 12 by screwing screws 51 into the screw holes 52. In the present disclosure, the lid 50 is screwed to the end surface 12b of the bearing housing 12 at positions where the end surface 12b is almost divided in three in the circumferential direction. By employing such a configuration, since the lid 50 is attached to the end surface 12b of the bearing housing 12 and covers the housing grooves 25 housing the engagement members 30, the engagement member 30 can be prevented from coming off of the bearing housing 12 in the axial direction. That is, the lid 50 faces the body portions 31 of the engagement members 30 in the axial direction. The engagement members 30 can come into contact with the lid 50.

Next, the operation of the radial foil bearing 3 having the configuration described above will be described.

In a state where the rotary shaft 1 is stopped, the top foil 9 is biased toward the rotary shaft 1 by the back foil 11 (three back foil pieces 11a) via the intermediate foil 10 (three intermediate foil pieces 10a) to be brought into close contact with the rotary shaft 1. In the embodiment, since both end portions of the top foil 9 are the thin wall portions 24, a force (local preload) for tightening the rotary shaft 1 is alleviated in the thin wall portions 24, compared to a case where there is no thin wall portion 24.

Then, when the rotary shaft 1 is rotated in an arrow P direction in FIG. 2, the rotary shaft 1 starts to rotate at a low speed initially, and then gradually accelerates to rotate at a high speed. Then, as indicated with an arrow Q in FIG. 2, an ambient fluid is drawn in from one end side of each of the top foil 9, the intermediate foil 10, and the back foil 11, and flows into a space between the top foil 9 and the rotary shaft 1. Accordingly, a fluid lubrication film is formed between the top foil 9 and the rotary shaft 1.

A film pressure of the fluid lubrication film acts on the top foil 9, and the crest portions 11c of the back foil pieces 11a are pressed via the intermediate foil 10 which is in contact with the top foil 9. Then, as the back foil pieces 11a are pressed by the intermediate foil 10, the crest portions 11c of the back foil pieces 11a are pressed and spread, and consequently, the back foil pieces 11a are about to move on the bearing housing 12 in the circumferential direction thereof. That is, since the back foil pieces 11a (back foil 11) elastically support the top foil 9 via the intermediate foil 10, when the back foil piece 11a receives a load from the top foil 9, the back foil piece 11a deforms in the circumferential direction thereof to allow the top foil 9 and the intermediate foil 10 to bend, thereby supporting the top foil 9 and the intermediate foil 10.

Here, as shown in FIG. 6, the engagement members 30 are engaged with both end edges of the back foil piece 11a in the axial direction. The engagement member 30 includes the engagement groove 34 provided between the claw portions 33 and extending in the axial direction, and the back foil 11 is inserted into the engagement groove 34 from the axial direction. The engagement member 30 is engaged with the housing groove 25 of the bearing housing 12 to suppress the rotation of the back foil piece 11a. Therefore, the respective crest portion 11c of the back foil piece 11a deforms in the circumferential direction about a position of the back foil piece 11a with which the engagement member 30 is engaged.

The body portion 31 of the engagement member 30 can come into contact with the back foil piece 11a to suppress the movement of the back foil piece 11a in the axial direction. In addition, as shown in FIG. 7, the engagement member 30 has the first claw portion 33A disposed radially inside the trough portion 11b of the back foil piece 11a, and the first claw portion 33A retains the back foil piece 11a in the radial direction. Therefore, the back foil piece 11a can be prevented from coming off. Further, with respect to the intermediate foil piece 10a, similar to the back foil piece 11a, the first claw portion 33A of the engagement member 30 is engaged with the intermediate foil piece 10a. Therefore, the intermediate foil piece 10a can also be prevented from coming off.

When a load is transmitted from the top foil 9 to the back foil pieces 11a, the intermediate foil pieces 10a bend together with the top foil 9 and the back foil pieces 11a, and "slip" occurs between the intermediate foil pieces 10a and the top foil 9 and between the intermediate foil pieces 10a and the back foil pieces 11a at the time. That is, when pressure fluctuations occur in the fluid lubrication film due to shaft vibration of the rotary shaft 1, the pressure fluctuations are transmitted to the top foil 9 and this "slip" occurs. Since this "slip" causes energy dissipation due to friction and attenuates the film pressure fluctuations, the shaft vibration of the rotary shaft 1 is suppressed.

In addition, when a fluctuating load (repetition of loading and unloading) due to the shaft vibration of the rotary shaft 1 acts on the back foil piece 11a and the load is on an unloading side, the back foil piece 11a slightly rises from the inner peripheral surface of the insertion hole 12a of the bearing housing 12. At this time, the first claw portion 33A of the engagement member 30 is hooked onto the back foil piece 11a (intermediate foil piece 10a), and the engagement member 30 is lifted together with the back foil piece 11a. Here, since the body portion 31 of the engagement member 30 is in contact with the housing groove 25 of the bearing housing 12 in the axial direction, "slip" occurs between the body portion 31 and the housing groove 25, which causes energy dissipation due to friction and contributes to attenuation.

On the other hand, when the load acting on the back foil piece 11a shifts to a loading side, the back foil piece 11a returns to its original position. At this time, the second claw portion 33B of the engagement member 30 is hooked onto the back foil piece 11a (intermediate foil piece 10a), and the engagement member 30 returns its original position together with the back foil piece 11a. At that time as well, "slip" occurs between the body portion 31 and the housing groove 25, which causes energy dissipation due to friction and contributes to attenuation. Further, as the second claw portions 33B are symmetrically provided on both sides of the first claw portion 33A, inclination of the engagement member 30 with respect to the radial direction can be suppressed, and the engagement member 30 can smoothly slide along the housing groove 25 in the radial direction.

As described above, according to the embodiment described above, the radial foil bearing 3 of the present disclosure includes the bearing housing 12, the back foil 11, and the engagement member 30, the bearing housing 12 has the insertion hole 12a through which the rotary shaft 1 is inserted, the back foil 11 is disposed on the inner peripheral surface of the insertion hole 12a, the engagement member 30 has the bent portion 32 disposed to overlap the back foil 11 in the radial direction of the insertion hole 12a and engaged with the back foil 11, and the body portion 31 attached to the bearing housing 12, the bent portion 32 has the engagement groove 34 extending to the end edge of the bent portion 32 in the axial direction of the insertion hole 12a, and the back foil 11 is disposed in the engagement groove 34. Accordingly, the back foil 11 can be prevented from coming off of the bearing housing 12.

Although an embodiment of the present disclosure has been described hereinbefore with reference to the drawings, the present disclosure is not limited to the embodiments. Various shapes and combinations of each component presented in the embodiment described above are merely an example, and a variety of changes can be made based on design requirements without departing from the scope of the present disclosure defined in claims.

For example, as modifications, configurations as shown in FIGS. 9 to 12C can be adopted. In the following description, configurations which are the same or equivalent to the embodiment described above will be assigned with the same reference signs, and a description thereof will be simplified or omitted.

Figure 9:
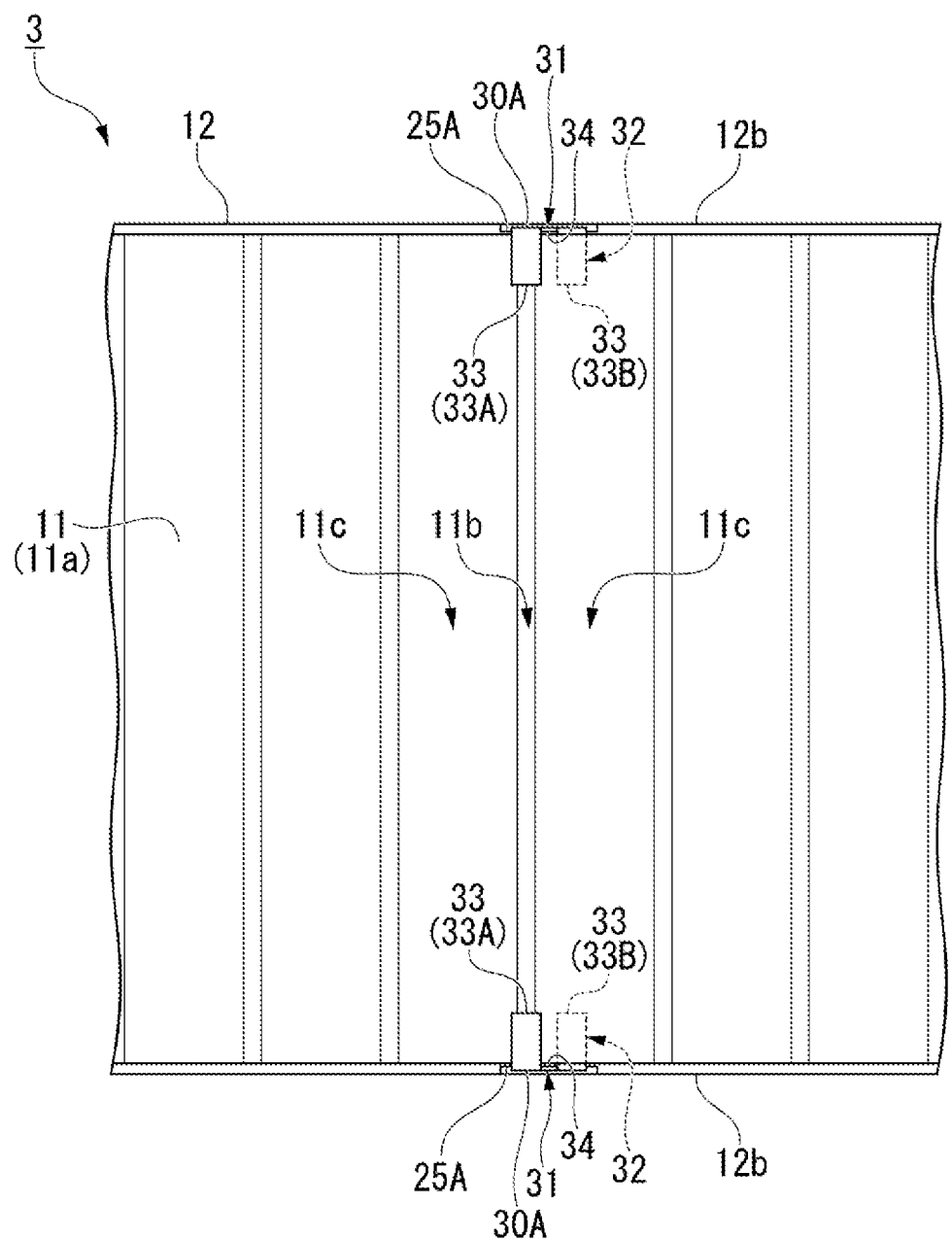
FIG. 9 is an unfolded plan view of a bearing housing illustrating an arrangement of an engagement member with respect to a back foil according to a modification example of the present disclosure.
Figure 10:
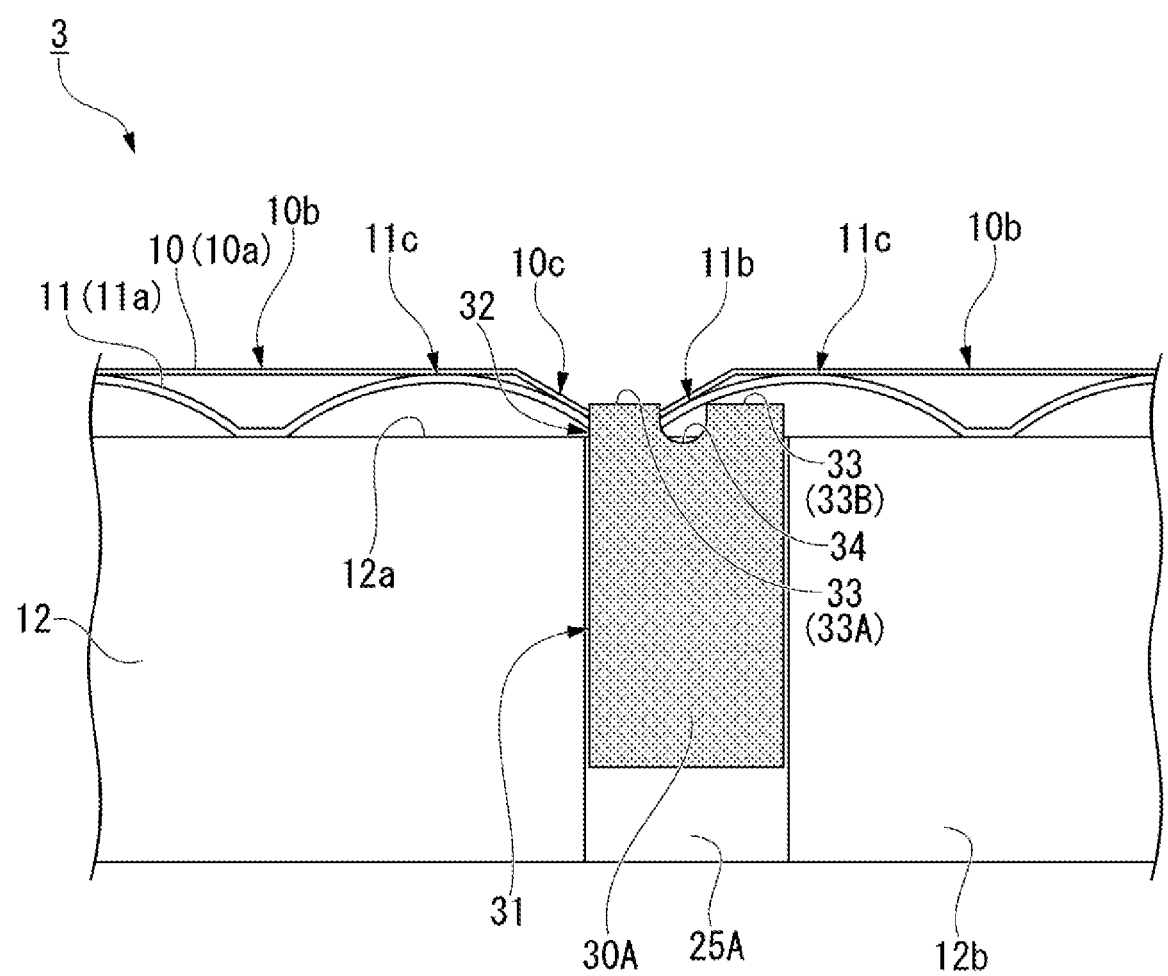
FIG. 10 is a front view illustrating an arrangement of the engagement member with respect to an intermediate foil and the back foil according to the modification example of the present disclosure.

FIG. 9 is an unfolded plan view of the bearing housing 12 illustrating an arrangement of an engagement member 30A with respect to the back foil 11 according to a modification example of the present disclosure. FIG. 10 is a front view illustrating an arrangement of the engagement member 30A with respect to the intermediate foil 10 and the back foil 11 according to the modification example of the present disclosure.

The engagement member 30A shown in FIGS. 9 and 10 is a two-claw type member in which one first claw portion 33A and one second claw portion 33B are provided, and one engagement groove 34 is formed.

The shape and dimension of the claw portion 33 of the two-claw type engagement member 30A are the same as the shape and dimension of the claw portion 33 of the three-claw type engagement member 30 described above. That is, as is explained with reference to FIG. 7, the width W of the first claw portion 33A in the circumferential direction is smaller than the width W2 of the trough portion 11b of the back foil 11. The width W2 of the trough portion 11b is not the width of the flat portion (refer to FIG. 5) which is a peak, on the radially outer side (on a bottom side), of the trough portion 11b, but is an interval between peaks, on the radially inner side, of the trough portions 11b, that is, an interval from the peak (apex) of one crest portion 11c to the peak (apex) of the other crest portion 11c of two crest portions 11c which are adjacent to each other with the trough portion 11b interposed therebetween. The width W2 of the trough portion 11b is larger than the width W1 of the groove portion 10c. Therefore, the width W of the first claw portion 33A, the width W1 of the groove portion 10c, and the width W2 of the trough portion 11b satisfy the relationship of W<W1<W2. The bent portion 32 is positioned between the peaks (apexes) of the two crest portions 11c which are adjacent to each other with the trough portion 11b interposed therebetween.

The width of a housing groove 25A of the bearing housing 12 is reduced so as to correspond to the two-claw type engagement member 30A. Similar to the embodiment described above, the engagement member 30A can prevent the back foil 11 and the intermediate foil 10 from coming off and can contribute to attenuation of the shaft vibration of the rotary shaft 1 by causing energy dissipation due to friction. Since the number of claw portions 33 is smaller in the engagement member 30A than the three-claw type engagement member 30, the engagement member 30A can be manufactured easier, which contributes to cost reduction.

Figure 11A:
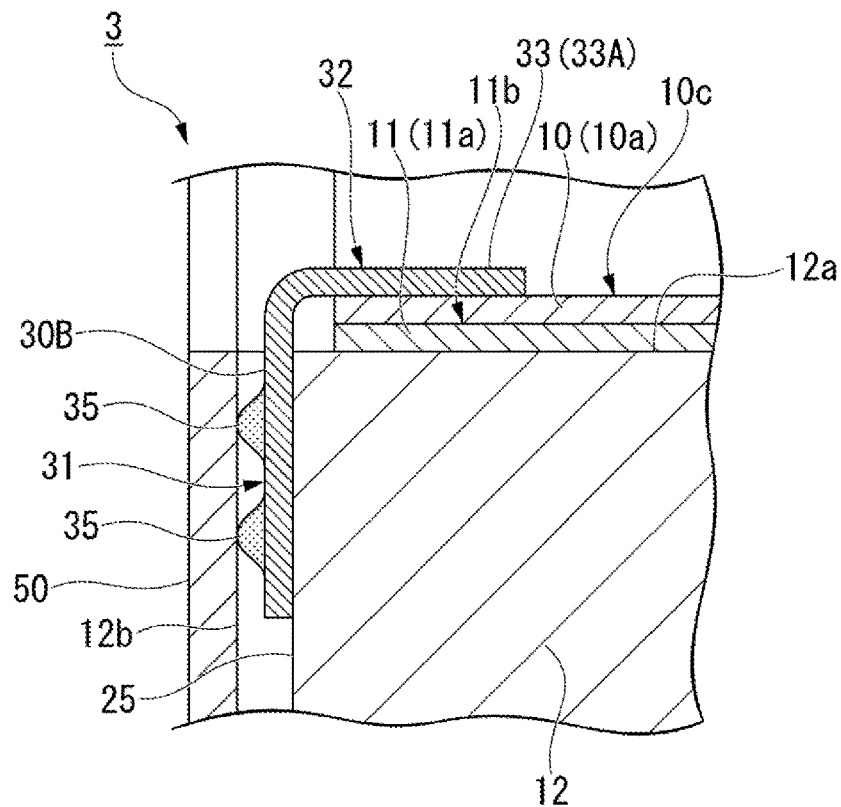
FIG. 11A is a sectional view of an engagement member taken along an axial direction according to another modification example of the present disclosure.
Figure 11B:
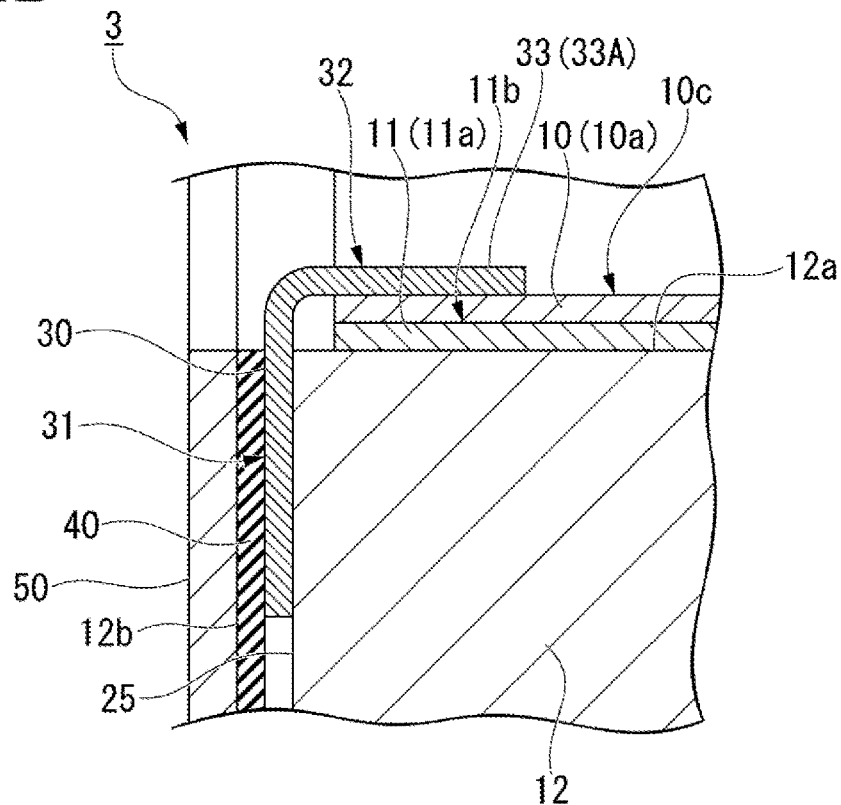
FIG. 11B is a sectional view of an elastic body taken along an axial direction according to another modification example of the present disclosure.

FIG. 11A is a sectional view of an engagement member 30B taken along the axial direction according to another modification example of the present disclosure, and FIG. 11B is a sectional view of an elastic body 40 taken along the axial direction according to another modification example of the present disclosure.

The engagement member 30B shown in FIG. 11A has bulge portions 35 (preload portion) protruding from the body portion 31 toward the lid 50 in the axial direction. The bulge portions 35 are formed, for example, by pressing, cutting and raising, bending or the like. The thickness of the engagement member 30B passing through a peak (apex) of the bulge portion 35 in the axial direction is slightly larger than the depth (length) of the housing groove 25 in the axial direction. With this configuration, as a preload in the axial direction is applied to the engagement member 30B between the bearing housing 12 and the lid 50, the energy dissipation due to friction described above can be enhanced.

Figure 12A:
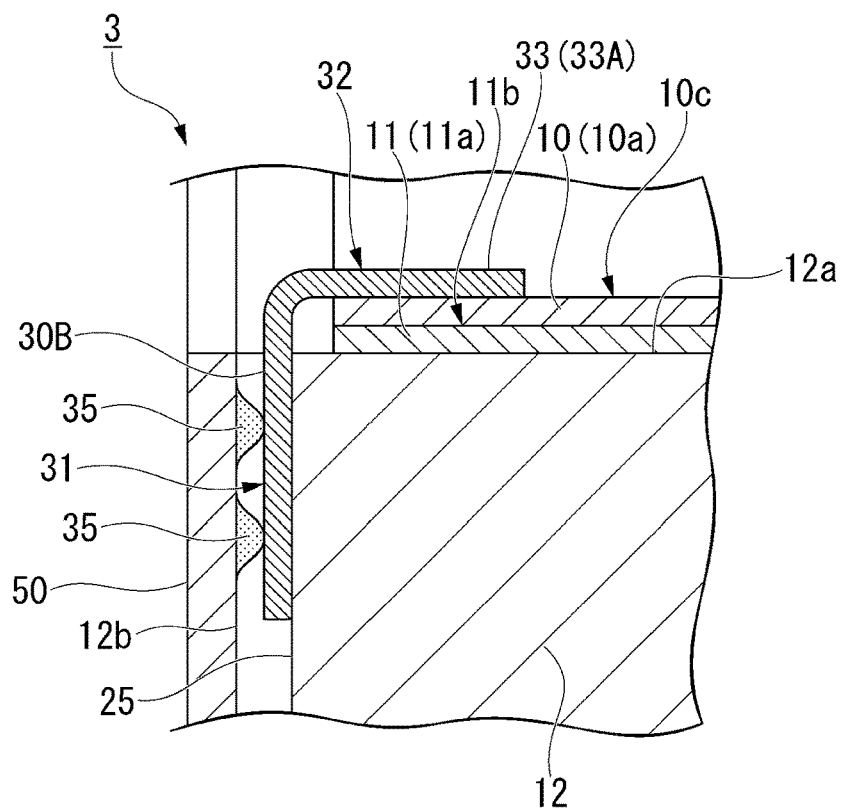
FIG. 12A is a sectional view of an engagement member taken along an axial direction according to yet another modification example of the present disclosure.
Figure 12B:
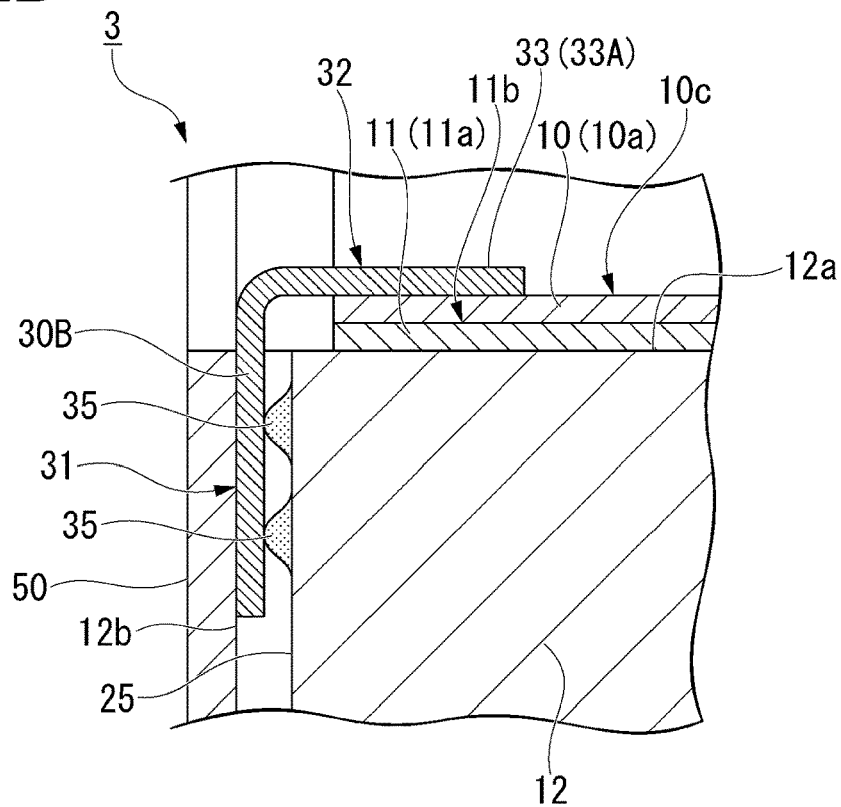
FIG. 12B is a sectional view of an engagement member taken along an axial direction according to still another modification example of the present disclosure.

The bulge portion 35 may be formed on the lid 50 (as shown in FIG. 12A), or may be formed on both of the engagement member 30B and the lid 50. The bulge portion 35 may be formed, between the engagement member 30B and the bearing housing 12 (housing groove 25), on at least one of the engagement member 30B and the bearing housing 12 (as shown in FIG. 12B). However, in order to secure a large friction area, at least one surface of the engagement member 30B (body portion 31) may be in surface contact with the bearing housing 12 or the lid 50.

In the modification example shown in FIG. 11B, a plate-shaped elastic body 40 (preload portion) is disposed between the engagement member 30 and the lid 50. The elastic body 40 is formed of an elastic material such as rubber, and is preferably formed of heat-resistant rubber that can withstand about 100 to 300° C. The thickness of the elastic body 40 in the axial direction is slightly larger than a length, in the axial direction, obtained by subtracting the thickness of engagement member 30 from the depth (length) of the housing groove 25. With this configuration, as a preload in the axial direction is applied to the engagement member 30 between the bearing housing 12 and the lid 50, the energy dissipation due to friction described above can be enhanced.

Figure 12C:
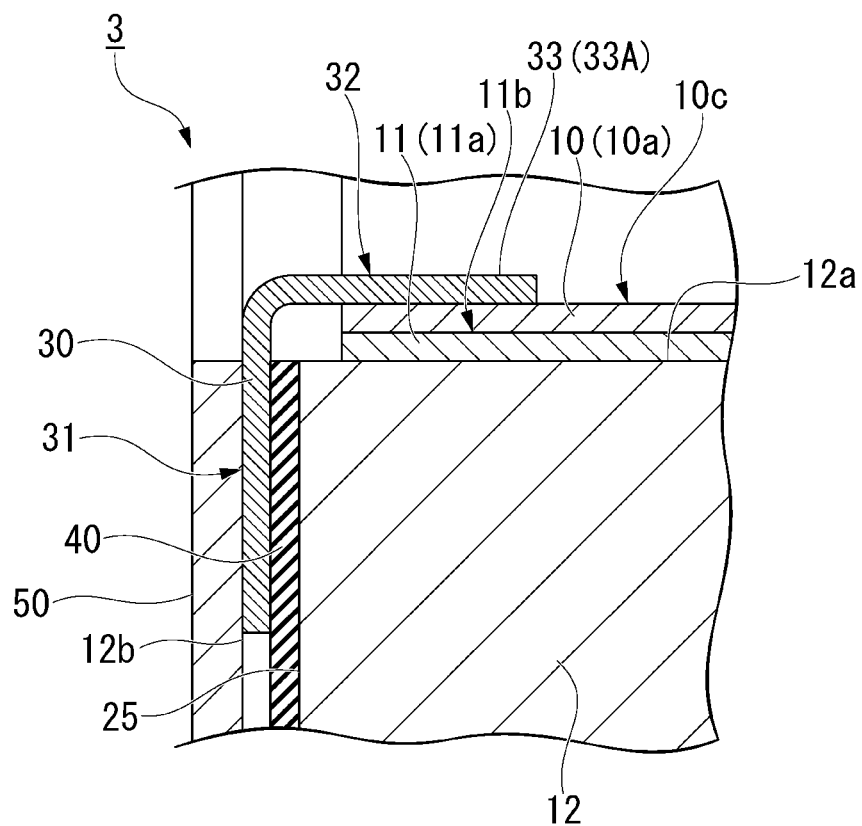
FIG. 12C is a sectional view of an elastic body taken along an axial direction according to yet another modification example of the present disclosure.

When the elastic body 40 is provided as shown in FIG. 11B, the energy dissipation due to friction occurs between the engagement member 30 and the bearing housing 12, and the elastic body 40 follows the sliding movement of the engagement member 30 within an elastically deformable range in the radial direction. The elastic body 40 may be disposed between the engagement member 30 and the bearing housing 12 (as shown in FIG. 12C). In this case, the energy dissipation due to friction occurs between the engagement member 30 and the lid 50. However, also in this case, in order to secure a large friction area, at least one surface of the engagement member 30 (body portion 31) may be in surface contact with the bearing housing 12 or the lid 50.

In addition, in the embodiment described above, the radial foil bearing 3 including the intermediate foil 10 has been exemplary illustrated. However, a configuration in which the intermediate foil 10 is omitted and the engagement member 30 is hooked onto only the back foil 11 may be adopted.

In addition, for example, the housing groove 25 may have a coating for adjusting friction. A copper coating may be used as this coating.

In addition, in the embodiment described above, for example, the configuration in which the pair of housing grooves 25 extending outward in the radial direction from the inner periphery edge of the insertion hole 12a are formed in both end surfaces 12b of the bearing housing 12 in the axial direction has been exemplary illustrated. However, in a case where one end surface 12b of the bearing housing 12 is attached to, for example, an attachment target (support flange or the like), a configuration in which the housing groove 25 is formed on only the other end surface 12b of the bearing housing 12 in the axial direction may be adopted. Further, a configuration in which the lid 50 is attached to only the other end surface 12b may be adopted.

The invention claimed is:

1. A radial foil bearing comprising:
a bearing housing which has an insertion hole through which a shaft is inserted;
a back foil which is disposed on an inner peripheral surface of the insertion hole; and
an engagement member which includes a first part and a second part, the first part being disposed to overlap the back foil in a radial direction of the insertion hole and engaged with the back foil, and the second part being attached to the bearing housing,
wherein the first part has an engagement groove which extends to an end edge of the first part in an axial direction of the insertion hole, and
the back foil is disposed in the engagement groove.

2. The radial foil bearing according to claim 1,
wherein the back foil has crest portions and trough portions which are alternately formed in a circumferential direction of the inner peripheral surface of the insertion hole, and
the first part has a first claw portion and a second claw portion provided on opposing sides of the engagement groove with respect to each other, the first claw portion being disposed inside the trough portion in the radial direction, and the second claw portion being disposed outside the crest portion in the radial direction.

3. The radial foil bearing according to claim 2, further comprising
an intermediate foil which is supported by the back foil and has a groove portion disposed inside the trough portion in the radial direction,
wherein the first claw portion is disposed inside the groove portion in the radial direction.

4. The radial foil bearing according to claim 2,
wherein the first part comprises two second claw portions, and in the first part, the two second claw portions are provided on opposing sides of the first claw portion with respect to each other.

5. The radial foil bearing according to claim 1,
wherein the engagement member is attached to an end surface of the bearing housing in the axial direction to be slidable in the radial direction.

6. The radial foil bearing according to claim 1,
wherein the bearing housing has a housing groove which is provided in an end surface of the bearing housing in the axial direction and extends outward in the radial direction from an inner periphery edge of the insertion hole, and
the second part is disposed in the housing groove.

7. The radial foil bearing according to claim 1, further comprising
a lid which is attached to an end surface of the bearing housing in the axial direction and covers the engagement member.

8. The radial foil bearing according to claim 7, further comprising
a preload portion which is provided between the bearing housing and the lid and is configured to apply a preload in the axial direction to the engagement member.

9. The radial foil bearing according to claim 8,
wherein the preload portion has a bulge portion which protrudes from at least one of the engagement member, the bearing housing, and the lid, and is disposed between the engagement member and the bearing housing or between the engagement member and the lid.

10. The radial foil bearing according to claim 8,
wherein the preload portion has an elastic body disposed between the engagement member and the bearing housing or between the engagement member and the lid.

* * * * *